(12) United States Patent
Andrivon et al.

(10) Patent No.: US 11,544,824 B2
(45) Date of Patent: Jan. 3, 2023

(54) METHOD AND DEVICE FOR GENERATING A SECOND IMAGE FROM A FIRST IMAGE

(71) Applicant: InterDigital VC Holdings, Inc., Wilmington, DE (US)

(72) Inventors: Pierre Andrivon, Cesson-Sevigne (FR); Marie-Jean Colaitis, Cesson-Sevigne (FR); David Touze, Cesson-Sevigne (FR); Joan Llach Pinsach, Cesson-Sevigne (FR)

(73) Assignee: InterDigital VC Holdings, Inc., Wilmington, DE (US)

( * ) Notice: Subject to any disclaimer, the term of this patent is extended or adjusted under 35 U.S.C. 154(b) by 273 days.

(21) Appl. No.: 16/762,928

(22) PCT Filed: Nov. 6, 2018

(86) PCT No.: PCT/US2018/059351
§ 371 (c)(1),
(2) Date: May 9, 2020

(87) PCT Pub. No.: WO2019/094356
PCT Pub. Date: May 16, 2019

(65) Prior Publication Data
US 2020/0394775 A1    Dec. 17, 2020

(30) Foreign Application Priority Data

Nov. 9, 2017 (EP) ................................. 17306556

(51) Int. Cl.
*G06V 10/00* (2022.01)
*G06T 5/00* (2006.01)
(Continued)

(52) U.S. Cl.
CPC ............. *G06T 5/009* (2013.01); *H04N 9/68* (2013.01); *H04N 9/73* (2013.01); *H04N 19/46* (2014.11);
(Continued)

(58) Field of Classification Search
CPC ........ G06K 9/4652; G06K 9/38; G06T 7/408; G06T 7/0081; G06T 7/0083; G06T 5/001;
(Continued)

(56) References Cited

U.S. PATENT DOCUMENTS 5,257,097 A * 10/1993 Pineau ................. H04N 1/6011
  358/500
5,416,890 A * 5/1995 Beretta ............... G06F 3/04845
  345/590

(Continued)

FOREIGN PATENT DOCUMENTS

JP     2005318491 A    11/2005

OTHER PUBLICATIONS

Anonymous, "High-Performance Single Layer High Dynamic Range (HDR) System for use in Consumer Electronics devices; Part 2: Enhancements for Perceptual Quantization (PQ) transfer function based on High Dynamic Range (HDR) Systems (SL-HDR2)", European Telecommunications Standards Institute (ETSI), ETSI TS 103 433-2 V0.0.3 Technical Specification, Sep. 2017, 41 pages.

(Continued)

*Primary Examiner* — Amir Alavi
(74) *Attorney, Agent, or Firm* — Condo Roccia Koptiw LLP (57) ABSTRACT

Described are methods and devices for applying a color gamut mapping process on a first image to generate a second image, where the content of the first and second images is similar but the respective color spaces of the first and second images are different. The color gamut mapping process may
(Continued)

be controlled using a color gamut mapping mode obtained from a bitstream where the color gamut mapping mode belongs to a set comprising at least two preset modes and an explicit parameters mode. If the obtained color gamut mapping mode is the explicit parameters mode and the color gamut mapping process is not enabled for the explicit parameters mode, the color gamut mapping process may be controlled by a substitute color gamut mapping mode determined from additional data.

13 Claims, 7 Drawing Sheets (51) Int. Cl.
    H04N 19/46    (2014.01)
    H04N 19/85    (2014.01)
    H04N 9/68     (2006.01)
    H04N 9/73     (2006.01)
(52) U.S. Cl.
    CPC .... *H04N 19/85* (2014.11); *G06T 2207/20208* (2013.01)
(58) Field of Classification Search
    CPC ............... G06T 5/40; G06T 11/001; G06T 2207/10024; G06T 2207/20144; H04N 1/6058; H04N 1/6027; H04N 1/60; H04N 9/045; H04N 19/46; H04N 19/85; G06F 17/30243
    See application file for complete search history.

(56) References Cited

U.S. PATENT DOCUMENTS

| | | | | |
|---|---|---|---|---|
| 5,748,342 | A * | 5/1998 | Usami | H04N 1/46 358/523 |
| 5,781,206 | A * | 7/1998 | Edge | H04N 1/40006 347/172 |
| 7,643,036 | B1 * | 1/2010 | Rees | G01J 3/52 345/589 |
| 2003/0164968 | A1 * | 9/2003 | Iida | H04N 1/6058 358/1.9 |
| 2004/0096104 | A1 * | 5/2004 | Terekhov | H04N 1/6058 358/518 |
| 2007/0046958 | A1 * | 3/2007 | Hoof | H04N 1/6058 358/1.9 |
| 2007/0188786 | A1 * | 8/2007 | Kim | H04N 1/6058 358/1.9 |
| 2007/0211074 | A1 * | 9/2007 | Yeung | H04N 1/6052 345/604 |
| 2008/0055331 | A1 * | 3/2008 | Iourcha | H04N 19/60 375/E7.176 |
| 2012/0050756 | A1 | 3/2012 | Maloney et al. | |
| 2015/0170389 | A1 | 6/2015 | Ming et al. | |
| 2016/0309154 | A1 | 10/2016 | Rusanovskyy et al. | |
| 2017/0064334 | A1 | 3/2017 | Minoo | |
| 2018/0063500 | A1 * | 3/2018 | Rusanovskyy | H04N 19/124 |

OTHER PUBLICATIONS

Anonymous, "High Efficiency Video Coding", International Telecommunication Union, Series H: Audiovisual and Multimedia Systems, Infrastructure of Audiovisual Services—Coding of Moving Video, Recommendation ITU T H.265 Standard, Telecommunication Standardization Sector of ITU, Dec. 2016, pp. 1-664.

Diaz et al., "Integrating HEVC Video Compression with a High Dynamic Range Video Pipeline", SMPTE Motion Imaging Journal, vol. 125, No. 1, Jan. 2016, pp. 14-21.

Francois et al., "A Single-Layer HDR Video Coding Framework with SDR Compatibility"; IBC 2016 Conference, Amsterdam, Netherlands, Sep. 8, 2016, 10 pages.

Anonymous, "High-Performance Single Layer High Dynamic Range (HDR) System for use in Consumer Electronics devices; Part 3: Enhancements for Hybrid Log Gamma (HLG) transfer function based on High Dynamic Range (HDR) Systems (SL-HDR3)", European Telecommunications Standards Institute (ETSI), ETSI TS 103 433-3 V0.0.1 Technical Specification, May 2017, 17 pages.

Anonymous, "High Dynamic Range Electro-Optical Transfer Function of Mastering Reference Displays", Society of Motion Picture and Television Engineers, SMPTE ST 2084:2014, Aug. 16, 2014, pp. 1-14.

Anonymous, "Reference software for ITU-T H.265 high efficiency video coding", International Telecommunication Union, ITU-T Telecommunication Standardization Sector of ITU, Series H: Audiovisual and Multimedia Systems, Infrastructure of audiovisual services—Coding of moving video, Recommendation ITU-T H.265.2, Oct. 2014, pp. 1-12.

Anonymous, "High-Performance Single Layer High Dynamic Range (HDR) System for use in Consumer Electronics devices; Part 1: Directly Standard Dynamic Range (SDR) Compatible HDR System (SL-HDR1)", European Telecommunications Standards Institute (ETSI), ETSI TS 103 433-1 V1.2.1 Technical Specification, Aug. 2017, 123 pages.

English Language Translation, Japanese Patent No. JP 2005318491 A.

* cited by examiner

METHOD AND DEVICE FOR GENERATING A SECOND IMAGE FROM A FIRST IMAGE

CROSS-REFERENCE TO RELATED APPLICATIONS

This application is the national stage entry, under 35 U.S.C. § 371 of International Application PCT/US2018/059351, filed Nov. 6, 2018, which was published in accordance with PCT Article 21(2) on May 16, 2019, in English, and which claims the benefit of European Patent Application No. 17306556.6, filed Nov. 9, 2017.

1. FIELD

The present principles generally relate to image/video processing for distribution of High Dynamic Range (HDR) image. Particularly, but not exclusively, the technical field of the present principles are related to generating a second image from a first image by applying a color gamut mapping process on the first image to generate the second image which differs from the color space, the color gamut mapping process being controlled at least by a color gamut mapping mode obtained from a bitstream.

2. BACKGROUND

The present section is intended to introduce the reader to various aspects of art, which may be related to various aspects of the present principles that are described and/or claimed below. This discussion is believed to be helpful in providing the reader with background information to facilitate a better understanding of the various aspects of the present principles. Accordingly, it should be understood that these statements are to be read in this light, and not as admissions of prior art.

In the following, an image contains one or several arrays of samples (pixel values) in a specific image/video format which specifies all information relative to the pixel values of an image (or a video) and all information which may be used by a display and/or any other device to visualize and/or decode a image (or video) for example. An image comprises at least one component, in the shape of a first array of samples, usually a luma (or luminance) component, and, possibly, at least one other component, in the shape of at least one other array of samples, usually a color component. Or, equivalently, the same information may also be represented by a set of arrays of color samples, such as the traditional tri-chromatic RGB representation.

A pixel value is represented by a vector of C values, where C is the number of components. Each value of a vector is represented with a number of bits which defines a maximal dynamic range of the pixel values.

Low-Dynamic-Range images (LDR images) are images whose luminance values are represented with a limited number of bits (most often 8 or 10). This limited representation does not allow correct rendering of small signal variations, in particular in dark and bright luminance ranges. In high-dynamic range images (HDR images), the signal representation is extended in order to maintain a high accuracy of the signal over its entire range. In HDR images, pixel values representing luminance levels are usually represented in floating-point format (either 32-bit or 16-bit for each component, namely float or half-float), the most popular format being openEXR half-float format (16-bit per RGB component, i.e. 48 bits per pixel) or in integers with a long representation, typically at least 16 bits.

The arrival of the High Efficiency Video Coding (HEVC) standard (ITU-T H.265 *Telecommunication standardization sector of ITU* (October 2014), series H: audiovisual and multimedia systems, infrastructure of audiovisual services—coding of moving video, High efficiency video coding, Recommendation ITU-T H.265) enables the deployment of new video services with enhanced viewing experience, such as Ultra HD broadcast services. In addition to an increased spatial resolution, Ultra HD can bring a wider color gamut (WCG) and a higher dynamic range (HDR) than the Standard dynamic range (SDR) HD-TV currently deployed (with a standard color gamut SCG). Different solutions for the representation and coding of HDR/WCG video have been proposed (SMPTE 2014, "High Dynamic Range Electro-Optical Transfer Function of Mastering Reference Displays, or SMPTE ST 2084, 2014, or Diaz, R., Blinstein, S. and Qu, S. "Integrating HEVC Video Compression with a High Dynamic Range Video Pipeline", SMPTE Motion Imaging Journal, Vol. 125, Issue 1. February, 2016, pp 14-21).

SDR backward compatibility with decoding and rendering devices is an important feature in some video distribution systems, such as broadcasting or multicasting systems.

Dual-layer coding is one solution to support this feature. However, due to its multi-layer design, this solution is not adapted to all distribution workflows.

An alternative is a single Layer HDR distribution solution as defined by the ETSI recommendation ETSI TS 103 433-1 (August 2017). The reader may also refer to the IBC 2016 article ("A single-Layer HDR video coding framework with SDR compatibility", E. Francois and L. Van de Kerkhof, IBC 2016) for more details. This single layer distribution solution is SDR compatible and leverages SDR distribution networks and services already in place. It enables both high quality HDR rendering on HDR-enabled CE devices, while also offering high quality SDR rendering on SDR CE devices. This single layer distribution solution is based on a single layer coding/decoding process and is codec independent (a 10 bits codec is recommended). This single layer distribution solution uses side metadata (of a few bytes per video frame or scene) that can be used in a post-processing stage to reconstruct the HDR signal from a decoded SDR signal and adapt the signal to the HDR-enabled CE devices. This single layer distribution solution preserves quality of HDR content (artistic intent), i.e. there is no visible impairment due to the SDR compatibility feature in comparison with HEVC coding with a bit depth of 8-bits to 10-bits per sample with 4:2:0 chroma sampling (so-called HEVC main 10 profile).

To benefit of such quality, corresponding methods including pre/post processing and metadata have been proposed for various HDR bitstreams. Accordingly, the ETSI recommendation ETSI TS 103 433 is divided in 3 parts SL-HDRx, each part addressing different distribution workflows. The ETSI recommendation ETSI TS 103 433-1 (2017-08), referred to as SL-HDR1 discloses a backward compatible system for transmitting an HDR video content based on a SDR video. The future ETSI recommendation ETSI TS 103 433-2, referred to as SL-HDR2, is to be drafted for display adaptation for PQ (Perceptual Quantization transfer function) video. The future ETSI recommendation ETSI TS 103 433-3, referred to as SL-HDR3 is drafted for a system for display adaptation for HLG (Hybrid Log-Gamma transfer function) video.

In particular, Annex D of ETSI TS 103 433-1 (SL-HDR1) provides the description of an invertible gamut mapping process that could apply when the input SDR picture of the SDR-to-HDR reconstruction process is provided in a BT.709 color gamut (as specified by the variable sdrPicColourSpace), and is different from the target BT.2020 color gamut of the HDR picture (as specified by the variable hdrPicColourSpace). In this annex, color backward compatibility is defined such that the CE receiver only supports BT.709 color space while the video to be distributed using SL-HDR1 can support BT.2020 color space. Annex D of the second stable draft of ETSI TS 103 433-2 (SL-HDR2) also provides the description of a gamut mapping based on Annex D of SL-HDR1. The skilled in the art will notice that the invertible gamut mapping defined in Annex D is not limited to SDR-to-HDR reconstruction but it compatible with any change of color spaces. In particular, the annex D of SL-HDR1 discloses a set of modes for invertible gamut mapping that are signaled to the CE devices through indication of explicit parameters, of preset methods or of an implementer dependent method. Low-end circuitry in some low-cost CE devices may not be capable to process the explicit parameters mode. In this case, these devices would arbitrate the following trade-off: either discard gamut mapping or use their own "blind" gamut mapping operator. In both cases, the experience of the user is degraded. This is an issue when appointing SL-HDR technologies as premium services delivery for high quality HDR rendering on HDR-enabled CE devices.

3. SUMMARY

The following presents a simplified summary of the present principles in order to provide a basic understanding of some aspects of the present principles. This summary is not an extensive overview of the present principles. It is not intended to identify key or critical elements of the present principles. The following summary merely presents some aspects of the present principles in a simplified form as a prelude to the more detailed description provided below.

The present principles set out to remedy at least one of the drawbacks of the prior art with a method for generating a second image from a first image, the method comprising applying a color gamut mapping process on the first image to generate the second image, the content of the second image being similar to the content of the first image but the color space of the second image is different from the color space of the first image, the color gamut mapping process being controlled at least by a color gamut mapping mode obtained from a bitstream, and the color gamut mapping mode belonging to a set comprising at least two preset modes and an explicit parameters mode. The method further comprises, in case the obtained color gamut mapping mode is the explicit parameters mode (gamutMappingMode is equal to 1) and in case the color gamut mapping process of the generating method is not enabled for the explicit parameters mode for generating the second image from the first image, determining a substitute color gamut mapping mode from additional data, the color gamut mapping process being then controlled by the substitute color gamut mapping mode instead of the explicit parameters mode.

According to an embodiment, determining color gamut mapping mode further comprises selecting a color gamut mapping mode among the at least two preset modes.

According to an embodiment, additional data comprising at least one of the color space of the first image, the color space of the second image, the color space of the mastering display used to generate the first image, the color space of the mastering display used to generate the second image.

According to an embodiment, additional data are metadata signaled in the bitstream. According to an alternative embodiment, additional data are determined by the application environment, for instance additional data (such as the hdrDisplayColourSpace decribed below) is signaled or stored in a configuration file of the application.

According to an embodiment, the bitstream is an SL-HDR1 bitstream. In that case, determining substitute color gamut mapping mode comprising selecting preset mode BT.709 to P3D65 gamut (substitute gamutMappingMode is set to "2") when hdrDisplayColourSpace is equal to "2" and selecting preset mode BT.709 to BT.2020 gamut (substitute gamutMappingMode is set to "3") when hdrDisplayColourSpace is equal to "1".

According to an embodiment, the bitstream is an SL-HDR2 bitstream. In that case, determining substitute color gamut mapping mode comprising selecting preset mode P3D65 to BT.709 gamut (substitute gamutMappingMode is set to "4") when hdrDisplayColourSpace is equal to "2" and selecting preset mode BT.2020 to BT.709 gamut (substitute gamutMappingMode is set to "5") when hdrDisplayColourSpace is equal to "1".

According to an embodiment, the color gamut mapping process is determined to not be capable of using the explicit parameters mode according to an indicator. In a variant the indicator stored in the device implementing the method.

According to other of their aspects, the present principles relate to a device for generating a second image from a first image, a computer program product comprising program code instructions to execute the steps of the disclosed method when this program is executed on a computer, a processor readable medium having stored therein instructions for causing a processor to perform at least the steps of the disclosed method when this program is executed on a computer. Any of the embodiments described for the method is compatible with the device.

4. BRIEF DESCRIPTION OF DRAWINGS

In the drawings, examples of the present principles are illustrated. It shows.

Similar or same elements are referenced with the same reference numbers.

5. DESCRIPTION OF EXAMPLE OF THE PRESENT PRINCIPLES

The present principles will be described more fully hereinafter with reference to the accompanying figures, in which examples of the present principles are shown. The present principles may, however, be embodied in many alternate forms and should not be construed as limited to the examples set forth herein. Accordingly, while the present principles are susceptible to various modifications and alternative forms, specific examples thereof are shown by way of examples in the drawings and will herein be described in detail. It should be understood, however, that there is no intent to limit the present principles to the particular forms disclosed, but on the contrary, the disclosure is to cover all modifications, equivalents, and alternatives falling within the spirit and scope of the present principles as defined by the claims.

The terminology used herein is for the purpose of describing particular examples only and is not intended to be limiting of the present principles. As used herein, the singular forms "a", "an" and "the" are intended to include the plural forms as well, unless the context clearly indicates otherwise. It will be further understood that the terms "comprises", "comprising," "includes" and/or "including" when used in this specification, specify the presence of stated features, integers, steps, operations, elements, and/or components but do not preclude the presence or addition of one or more other features, integers, steps, operations, elements, components, and/or groups thereof. Moreover, when an element is referred to as being "responsive" or "connected" to another element, it can be directly responsive or connected to the other element, or intervening elements may be present. In contrast, when an element is referred to as being "directly responsive" or "directly connected" to other element, there are no intervening elements present. As used herein the term "and/or" includes any and all combinations of one or more of the associated listed items and may be abbreviated as"/".

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the present principles.

Although some of the diagrams include arrows on communication paths to show a primary direction of communication, it is to be understood that communication may occur in the opposite direction to the depicted arrows.

Some examples are described with regard to block diagrams and operational flowcharts in which each block represents a circuit element, module, or portion of code which comprises one or more executable instructions for implementing the specified logical function(s). It should also be noted that in other implementations, the function(s) noted in the blocks may occur out of the order noted. For example, two blocks shown in succession may, in fact, be executed substantially concurrently or the blocks may sometimes be executed in the reverse order, depending on the functionality involved.

Reference herein to "in accordance with an example" or "in an example" means that a particular feature, structure, or characteristic described in connection with the example can be included in at least one implementation of the present principles. The appearances of the phrase in accordance with an example" or "in an example" in various places in the specification are not necessarily all referring to the same example, nor are separate or alternative examples necessarily mutually exclusive of other examples.

Reference numerals appearing in the claims are by way of illustration only and shall have no limiting effect on the scope of the claims.

While not explicitly described, the present examples and variants may be employed in any combination or sub-combination.

The present principles are described for coding/decoding/reconstructing an image but extends to the coding/decoding/reconstruction of a sequence of images (video) because each image of the sequence is sequentially encoded/decoded/reconstructed as described below.

Figure 1:
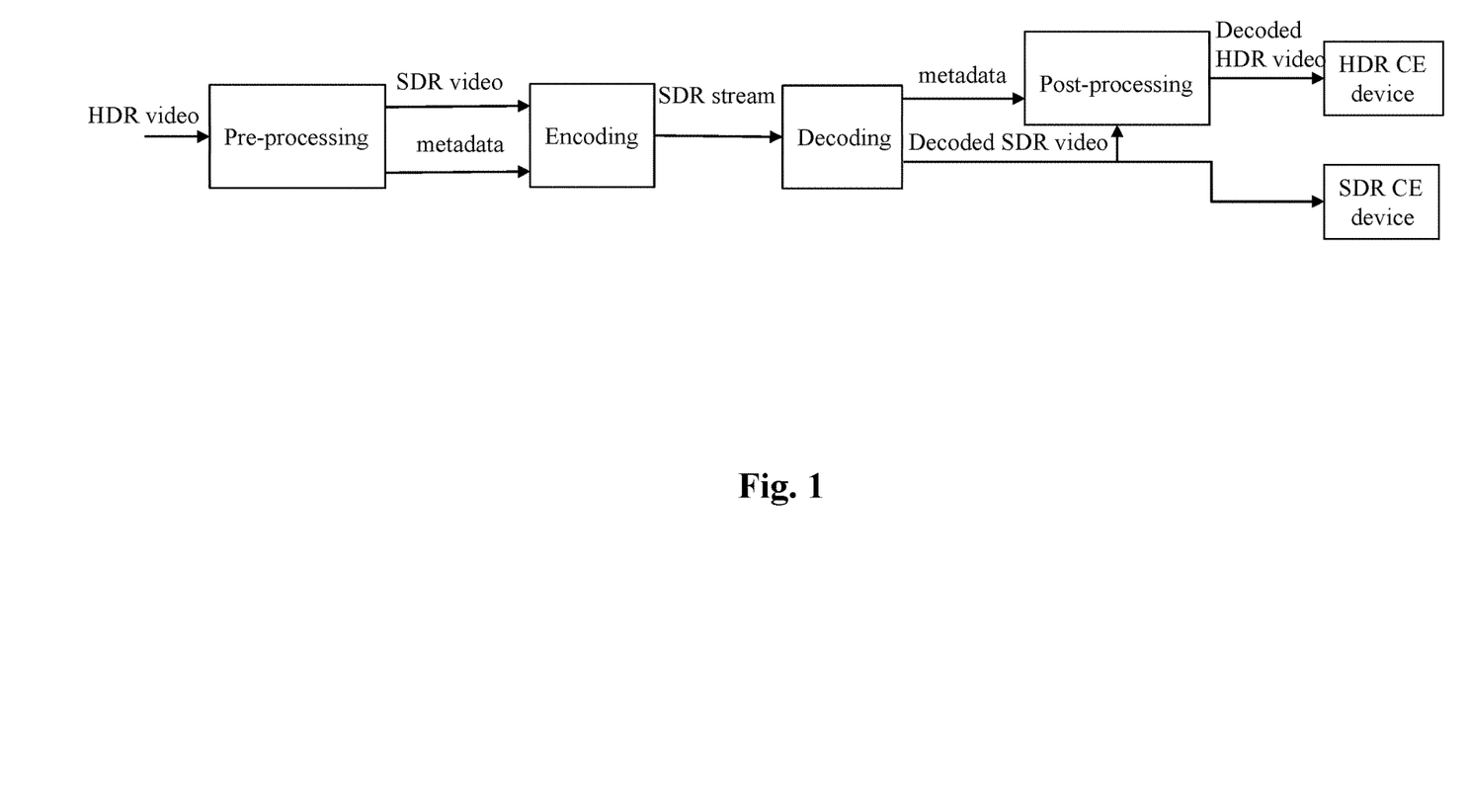
FIG. 1 shows an end-to-end workflow supporting content production and delivery to HDR and SDR displays.

FIG. 1 shows an end-to-end workflow supporting content production and delivery to HDR and SDR displays. It involves a single-layer SDR/HDR encoding-decoding with side metadata as defined, for example, in ETSI TS 103 433.

At a pre-processing stage, an incoming HDR video is decomposed in an SDR video and metadata. The SDR video is then encoded with any SDR video codec and an SDR bitstream is carried throughout an existing legacy SDR distribution network with accompanying metadata conveyed on a specific channel or embedded in the SDR bitstream. Preferably, the video coded is an HEVC codec such as the H.265/HEVC codec or H.264/AVC. The metadata are typically carried by SEI messages when used in conjunction with an H.265/HEVC or H.264/AVC codec.

The SDR bitstream is decoded and a decoded SDR video is then available for an SDR Consumer Electronics (CE) display.

Next, at a post-processing stage, which is functionally the inverse of the pre-processing stage, the HDR video is reconstructed from the decoded SDR video and from metadata obtained from a specific channel or from the SDR bitstream.

Figure 2:
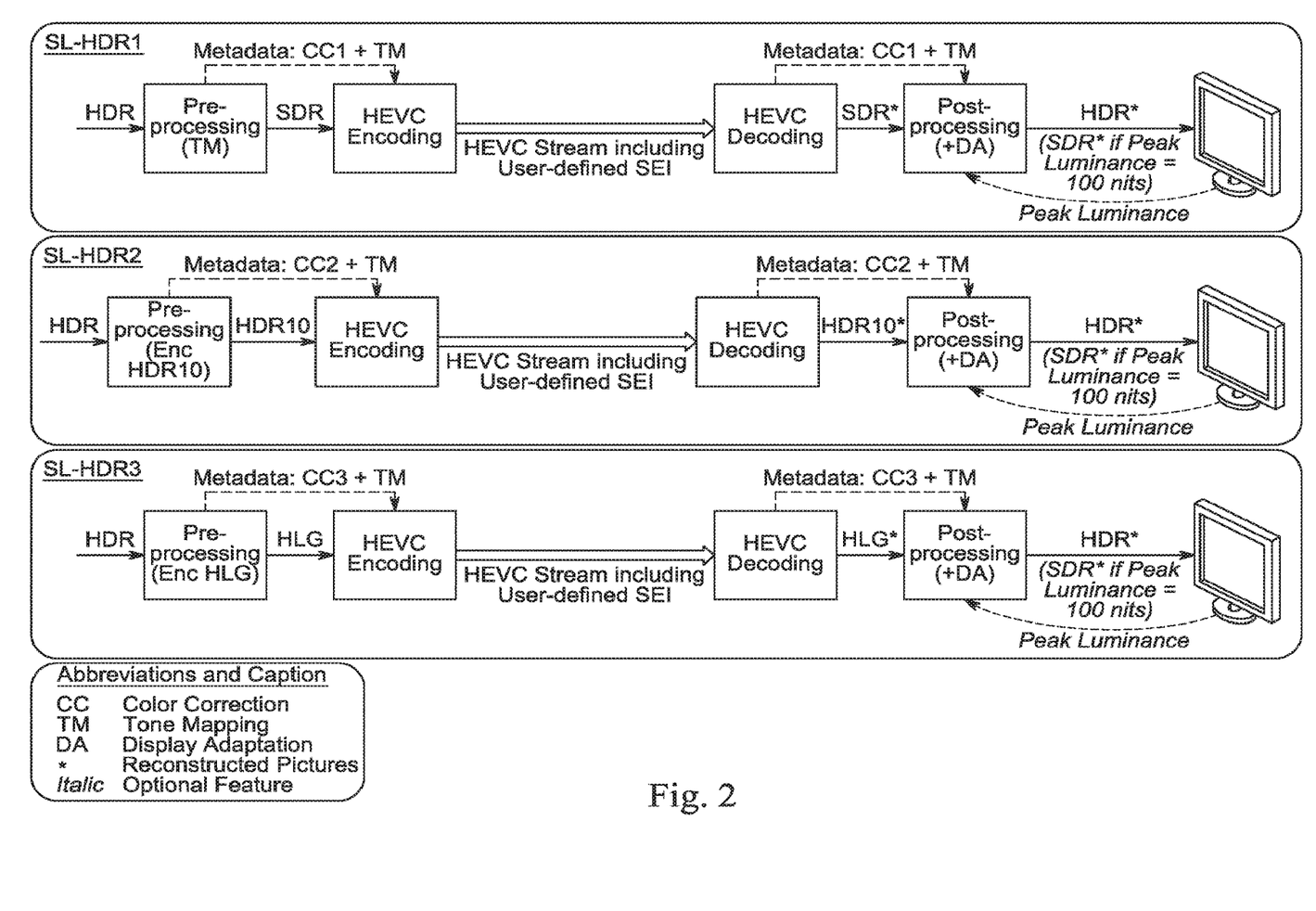
FIG. 2 shows non-limitative examples in accordance with single-layer distribution bitstream SL-HDRx of the end-to-end workflow of FIG.1.

FIG. 2 shows non-limitative examples in accordance with single-layer distribution bitstream SL-HDRx of the end-to-end workflow of FIG. 1.

The SL-HDR1 (ETSI TS 103 433-1) specification includes dynamic metadata (CC1+TM metadata) for signal reconstruction (metadata may be embedded in a user-defined SEI message for HEVC and include the mastering display color volume/space metadata and gamut mapping metadata to be used in post-processing); SDR-to-HDR reconstruction process specifying the post-processing to reconstruct the HDR signal from the decoded SDR signal and SL-HDR1 metadata. SL-HDR1 also describes the pre-processing to generate an SDR signal from the HDR content; the invertible gamut mapping process; the HDR-to-HDR display adaptation process; an error-concealment strategy in case metadata are lost or corrupted; signaling in CTA-861-G (notably for usage in HDMI2.1).

The extension SL-HDR2 (ETSI TS 103 433-2 in a second stable draft stage at the time of writing) addresses display adaptation for PQ10 and the extension SL-HDR3 (ETSI TS 103 433-3 in an early draft stage at the time of writing) addresses display adaptation and hue shift correction for HLG10. These extensions are built upon SL-HDR1 specification and reuse the same metadata and the same pixel-loop hardware in the post-processing. However, the post-processing is driven using a different software layer implementation.

Accordingly, an SL-HDRx bitstream is a bitstream containing a coded video and associated SL-HDRx metadata (as specified in Annex A or B of TS 103 433-X).

Figure 3A:
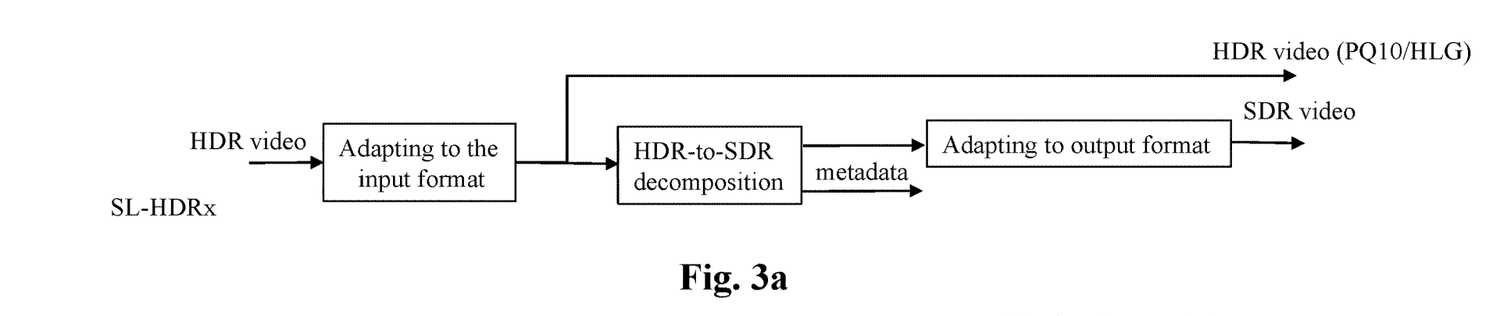
FIG. 3a depicts in more details the pre-processing stage with SL-HDRx bitstream.

FIG. 3a depicts in more details the pre-processing stage according to the non-limiting example of SL-HDR1 for the sake of clarity. However, the present principles are compatible with SL-HDR2 or SL-HDR3. It should be noted that the "color gamut mapping" term also cover "inverse color gamut mapping". Indeed, at the post-processor side, in SL-HDR1 an inverse gamut mapping process (extension of gamut) is applied while in SL-HDR2 a gamut mapping process (compression of gamut) is applied. At the pre-proc, SL-HDR1 and SL-HDR2/3 decomposes the signal from HDR-to-SDR. SL-HDR1 distributes the obtained SDR video and metadata while SL-HDR2 distributes an HDR10 version of the HDR video (they may be the same as masters are often HDR10) and metadata.

The core component of the pre-processing stage is the HDR-to-SDR decomposition that generates an SDR video and dynamic metadata from the HDR video. More precisely, the HDR-to-SDR decomposition aims at converting a HDR video represented in a specific input format (here RGB) to a SDR video represented in a specific output format (here $Y_{SDR}$, $U_{SDR}$, $V_{SDR}$) but the present principles are not limited to specific input/output format (color space or gamut).

Optionally, the format of the HDR video, respectively the format of the SDR video, may be adapted to said specific input format, respectively specific output format. Accordingly, the content of the HDR video is similar to the content of the SDR video, but the color space of the SDR video is different from the color space of the HDR video. Said input/output format adaptation may include color space conversion and/or color gamut mapping. Usual format adapting processes may be used such as RGB-to-YUV or YUV-to-RGB conversion, BT.709-to-BT.2020 or BT.2020-to-BT.709, down-sampling or up-sampling chroma components, etc. Note that the well-known YUV color space refers also to the well-known YCbCr or Y'CbCr or Y'C'bC'r in the prior art.

In particular, the annex D of SL-HDR1 specification describes an invertible gamut mapping driven by parameters/metadata carried in the bitstream so that the reconstructed extended HDR WCG signal quality is controlled and approved by operators or content creators thanks to a possible Quality Check stage during the generation phase of the parameters (before distribution). This controlled gamut mapping method advantageously enhances content fidelity over "blind" (i.e. not guided by metadata or parameters approved during the Quality Check stage) gamut mapping methods that ignore characteristics of the original content decomposed in a SDR SCG signal before transmission. The invertible gamut mapping specified in Annex D of ETSI SL-HDR1 specification covers different gamut mapping modes: explicit parameters carriage (wherein a full set of parameter values used in the gamut mapping process is sent to the CE devices), presets (wherein a set of predetermined parameter values are referred to by an index) or implementer dependent method (corresponding to blind methods).

TABLE 1

Gamut mapping mode present in SL-HDR1

| Value of gamutMappingMode | Gamut mapping mode |
|---|---|
| 0 | Implementation dependent method |
| 1 | Explicit parameters (see clause 6.3.9) |
| 2 | Preset #1: BT.709 to P3D65 gamut (see Table 12) |
| 3 | Preset #2: BT.709 to BT.2020 gamut (see Table 13) |
| 4-63 | Reserved for future use |
| 64-127 | Unspecified |
| 128-255 | Reserved for future use |

Figure 3B:
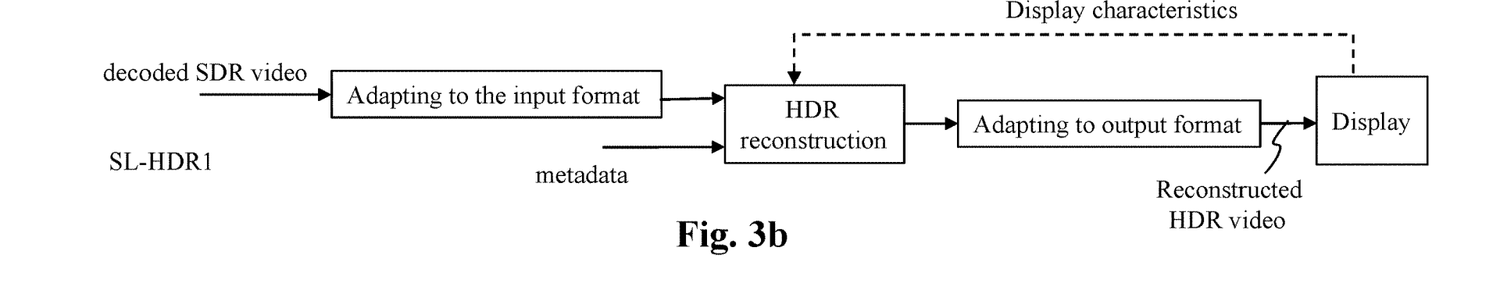
FIG. 3b depicts in more details the post-processing stage with SL-HDR1 bitstream.

FIG. 3b depicts in more details the post-processing stage according to the non-limiting example of SL-HDR1 for the sake of clarity. However, the presents principles are compatible with SL-HDR2 or SL-HDR3, as shown on FIG. 3c, using respectively the wording first video and second video instead of SDR video and HDR video, wherein the first video correspond to the encoded/decoded video of the bitstream (being SDR, HDR10 or HLG), and wherein the second video (HDR/SDR) corresponds to the rendered video on CE devices (Display) after post-processing.

The core component of the post-processing stage is the HDR reconstruction that generates a reconstructed HDR video from a decoded SDR video and metadata. More precisely, the HDR reconstruction aims at converting SDR video represented in a specific input format (here $Y_{SDR}$, $U_{SDR}$, $V_{SDR}$) to an output HDR video represented in a specific output format (here RGB) but the present principles are not limited to specific input/output specific formats (color space or color gamut or color primaries).

Optionally, the format of the reconstructed HDR video may be adapted to targeted system characteristics (e.g. a Set-Top-Box, a connected TV noted Display) and/or an inverse gamut mapping may be used when the decoded SDR video (input of the HDR reconstruction stage) and the reconstructed HDR video (output of the HDR reconstruction stage) are represented in different color spaces and/or gamut. Input or output format adapting may include color space conversion and/or color gamut mapping. Usual format adapting processes may be used such as RGB-to-YUV (or YUV-to-RGB) conversion, BT.709-to-BT.2020 or BT.2020-to-BT.709, down-sampling or up-sampling chroma components, etc. Annex E of the ETSI specification SL-HDR1 provides an example of format adapting processes and Annex D of the ETSI specification SL-HDR1 provides inverse gamut mapping processes. The HDR reconstruction is the functional inverse of the HDR-to-SDR decomposition.

Thus, as previously exposed for pre-processing, in a particular example, the gamut mapping GM (or inverse gamut mapping IGM depending of the color spaces of the input/output image) is advantageously controlled by a gamut mapping mode obtained from the bitstream and comprising an explicit parameters mode, at least two presets (corresponding to standardized color space conversion). However, some low-cost CE devices may not be enabled for processing the explicit parameters mode. In this case, these devices either discard gamut mapping (presenting a reconstructed content with a standard color palette) or use their own "blind" gamut mapping operator (ignoring the original extended/wide color gamut of the original content). A method for post processing the video from including a non-blind gamut mapping GM that accounts for the input extended/wide color gamut of the original content is therefore desirable.

Figure 3C:
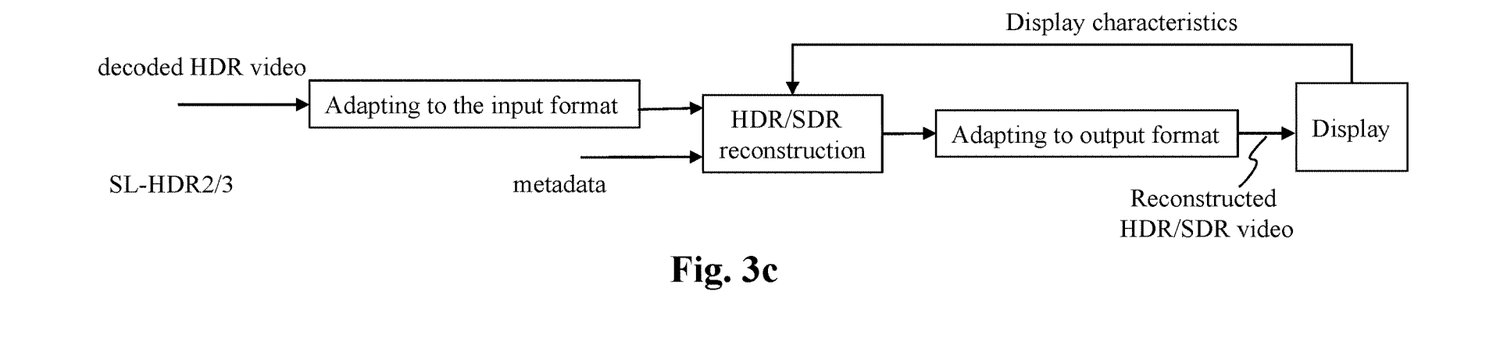
FIG. 3c depicts in more details the post-processing stage with SL-HDR2 or with SL-HDR3 bitstream.

FIG. 3c depicts in more details the post-processing stage according to the SL-HDR2 or SL-HDR3. for SL-HDR2. At the post-proc, the gamut mapping is applied on reconstructed SDR or HDR with lower peak luminance than the HDR signal carried on the distribution networks, and the gamut mapping controlled by metadata.

The core component of the post-processing stage is the HDR/SDR reconstruction that generates a reconstructed HDR video or reconstructed SDR video from the decoded HDR video and metadata. More precisely, the HDR reconstruction aims at converting HDR video represented in a specific input format to an output HDR/SDR video represented in a specific output format but the present principles are not limited to specific input/output specific formats (color space or color gamut or color primaries).

Optionally, the format of the reconstructed HDR/SDR video may be adapted to display characteristics (e.g. a Set-Top-Box, a connected TV) and/or an inverse gamut mapping may be used when the decoded HDR video (input of the HDR/SDR reconstruction stage) and the reconstructed HDR/SDR video (output of the HDR reconstruction stage) are represented in different color spaces and/or gamut. Input or output format adapting may include color space conversion and/or color gamut mapping. Usual format adapting processes may be used such as RGB-to-YUV (or YUV-to-RGB) conversion, BT.709-to-BT.2020 or BT.2020-to-BT.709, down-sampling or up-sampling chroma components, etc.

Thus, as previously exposed for pre-processing, in a particular example, the gamut mapping GM (or inverse gamut mapping IGM depending of the color spaces of the input/output image) is advantageously controlled by a gamut mapping mode obtained from the bitstream and comprising an explicit parameters mode, at least two presets (corresponding to standardized color space conversion). However, some low-cost CE devices may not be enabled for processing the explicit parameters mode. In this case, these devices either discard gamut mapping (presenting a reconstructed content with a standard color palette) or use their own "blind" gamut mapping operator (ignoring the original extended/wide color gamut of the original content). Again, a method for post processing the video from including a non-blind gamut mapping GM that accounts for the input extended/wide color gamut of the original content is therefore desirable.

Figure 4:
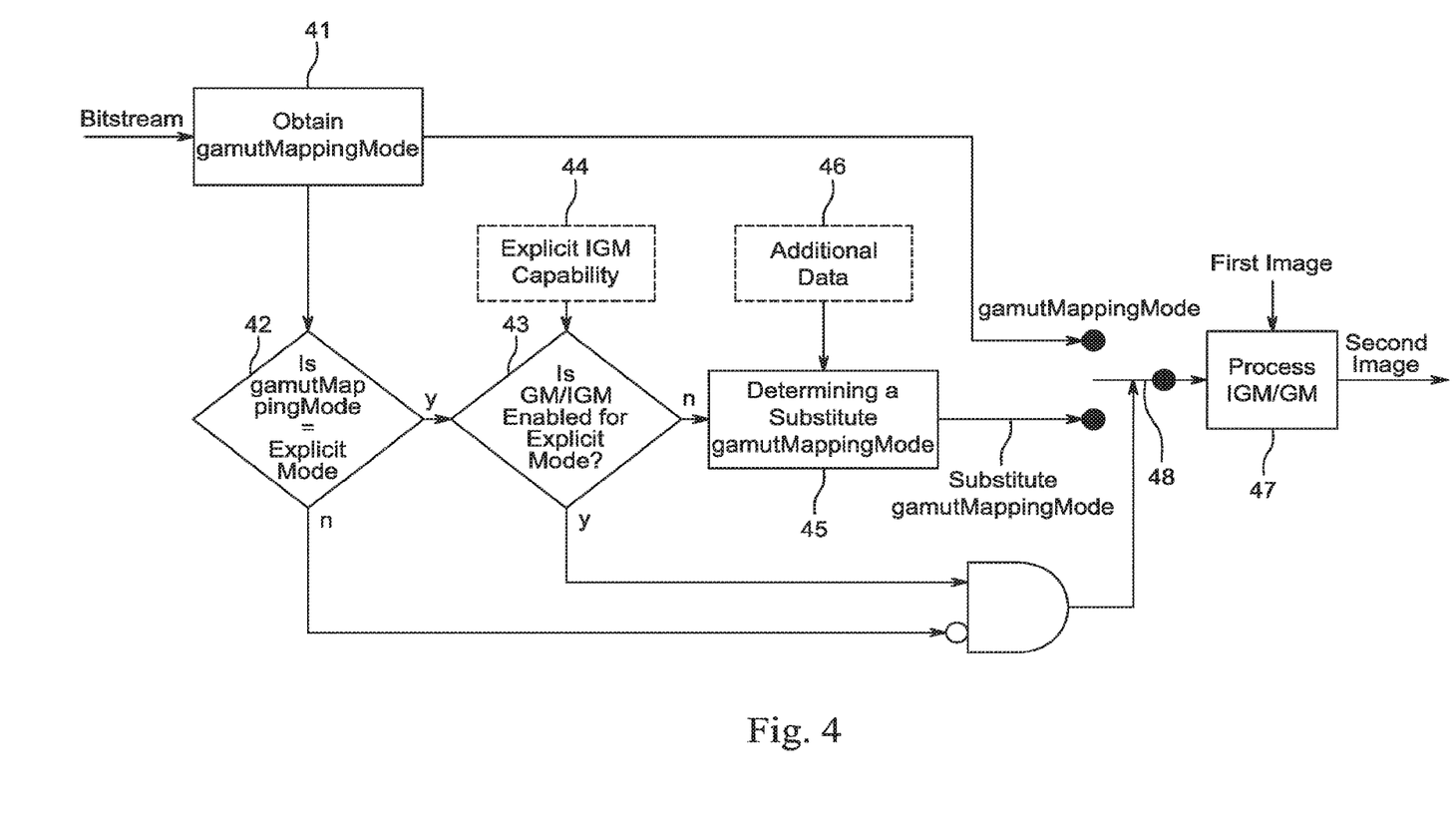
FIG. 4 shows a block diagram of the steps of a method for generating a second image from a first image in accordance with examples of the present principles.

FIG. 4 shows a block diagram of the steps of a method for generating a second image from a first image in accordance with examples of the present principles.

The method comprises, in a step 47, applying a color gamut mapping process (or an inverse gamut mapping process) on the first image to generate the second image. According to examples described above, the content of the second image is similar to the content of the first image, but the color space of the second image is different from the color space of the first image. For illustrative purpose, the second image may be an WCG image reconstructed in a BT 2020 color space and the first image may be a SCG image of a BT 709 color space (SL-HDR1 case); or the first image may be an SCG image of a BT 709 color space and the second image may be a WCG image in a BT 2020 color space (SL-HDR2 or SL-HDR3 case). According to a particular feature, the color gamut mapping process is controlled at least by a color gamut mapping mode, gamutMappingMode, obtained from a bitstream. Such color gamut mapping mode informs the CE device of the color gamut mapping used at pre-processing stage that would ensure high fidelity in color rendering after the post-processing stage between the master video content and the video content displayed by the CE device. According to another particular feature, the color gamut mapping mode belongs to a set comprising at least two preset modes and an explicit parameters mode as exposed for SL-HDRx specifications wherein the explicit parameters mode offers full parameters control of the gamut mapping process GM/IGM.

To that end, in step 41, the gamutMappingMode is obtained from the bitstream. The gamutMappingMode may be carried by metadata and may be obtained, for example, by parsing SEI messages as explained above. In a step 42, the gamutMappingMode is tested to check whether it is set to explicit parameters mode. In case the gamutMappingMode is not the explicit parameters mode, for instance if gamutMappingMode is set to a preset mode, the gamutMappingMode is passed to the step 47 for controlling the gamut mapping (GM/IGM). For example, presets are defined for different (possibly ranges of) content/image format color primaries.

In case the gamutMappingMode is the explicit parameters mode, in a step 43, the gamut mapping process is tested to check whether it is enabled for the explicit parameters mode, i.e. if the gamut mapping process is capable of applying a programmable gamut mapping that accounts with the gamut mapping parameters signaled with the explicit parameters mode. According to an embodiment of the method, an indicator 44 is representative of the explicit GM/IGM capability and is used to determine if the gamut mapping process is enabled for the explicit parameters mode. Such indicator is stored in a register. In case the gamut mapping process is enabled for the explicit parameters mode, the gamutMappingMode, along with the gamut mapping parameters, is passed to the step 47 for controlling the gamut mapping process (GM/IGM). In case the gamutMappingMode is the explicit parameters mode and in case the color gamut mapping process of the method is not enabled for the gamutMappingMode, in a step 45 a substitute color gamut mapping mode, substitute gamutMappingMode, is determined from additional data 46, then the substitute gamutMappingMode is passed to the step 47 for controlling the gamut mapping process (GM/IGM).

According to an embodiment, a switch 48 controlled by the outputs of tests 42 and 43 connects the gamutMappingMode or the substitute gamutMappingMode to the gamut mapping process 47.

According to an embodiment of the step 45, determining color gamut mapping mode further comprises selecting a color gamut mapping mode among the at least two preset modes. Advantageously, such embodiment preserves most of the benefit of an explicit gamut mode for processing gamut mapping within the presets-only-capable receiver/devices since the preset selection is not blind but controlled by additional data.

According to further embodiment of the step 45, the additional data comprises at least one of the color space of the first image, the color space of the second image, the color space of the mastering display used to generate the first image, the color space of the mastering display used to generate the second image, the color space of the target display, the color space of an input picture of SL-HDR pre-processing. In other words, the mapping toward a preset or the other(s) are determined for instance by the knowledge of the original WCG content color space or of the color space of the mastering display used to grade the original WCG content or the color space supported by the targeted display.

Figure 5A:
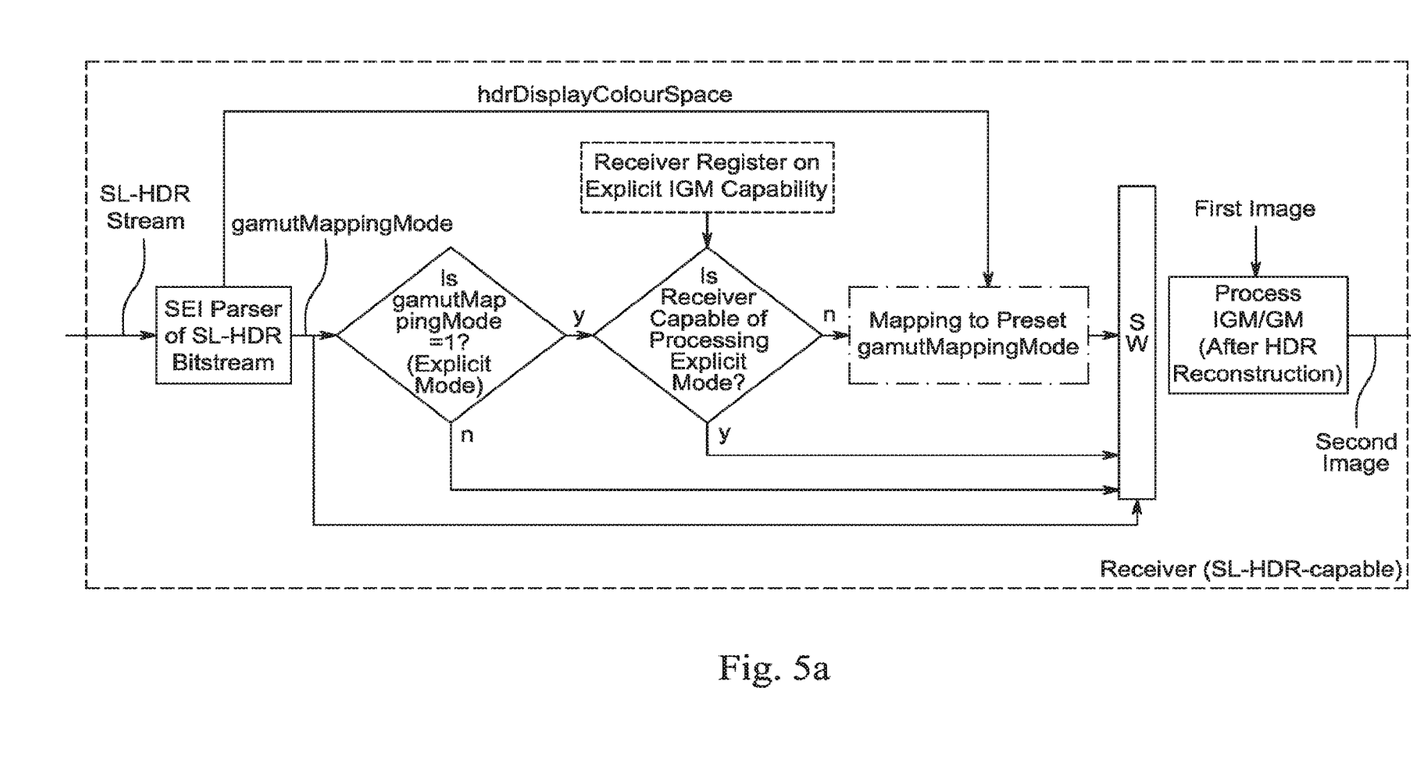
FIG. 5a illustrates a non-limitative example in accordance with SL-HDR bitstream of a block diagram of the steps of a method for generating a second image from a first image.

FIG. 5a illustrates a non-limitative example in accordance with SL-HDR bitstream of a block diagram of the steps of a method for generating a second image from a first image.

This method is based on any HDR or SDR reconstruction process requiring a SDR/HDR10/HLG image and metadata as input.

It is expected, during first deployment of SL-HDR, that all SL-HDR-capable (i.e. receiver that can process SL-HDR metadata in an embedded SL-HDR post-processor module) receiver supports a simplified version, for instance based on a limited set of 3D LUT, of the gamut mapping process while not being enabled for analytical process such as defined in Annex D. Accordingly, a receiver device that is not capable to process or interpret these explicit parameters may indicate this capability thanks to a device internal register, or thanks to a bit in VSVDB or HDMI HDR Dynamic Metadata Data Block or EDID in the receiver processing the gamut mapping.

As described for FIG. 4, the receiver parses SEI metadata from the SL-HDR bitstream to obtain at least the gamutMappingMode and one of the hdrDisplayColourSpace or the hdrMasterDisplayColourSpace (See Annex A of SL-HDR1). If the gamutMappingMode is set to '1', meaning as shown in table 1 that the gamut mapping mode is the explicit parameter mode, and if the SL-HDR-capable receiver is only enabled for preset modes, then a mapping module determines a substitute gamutMappingMode based on one of hdrDisplayColourSpace or the hdrMasterDisplayColourSpace.

Figure 5B:
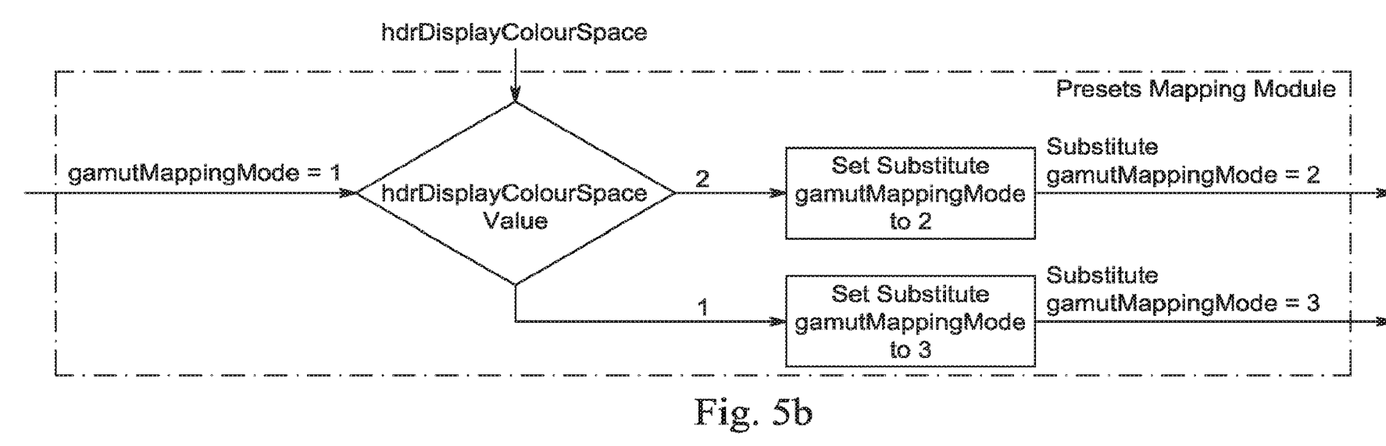
FIG. 5b illustrates a non-limitative example in accordance with SL-HDR1 bitstream of a block diagram of the step of determining a substitute gamut mapping mode.
Figure 5C:
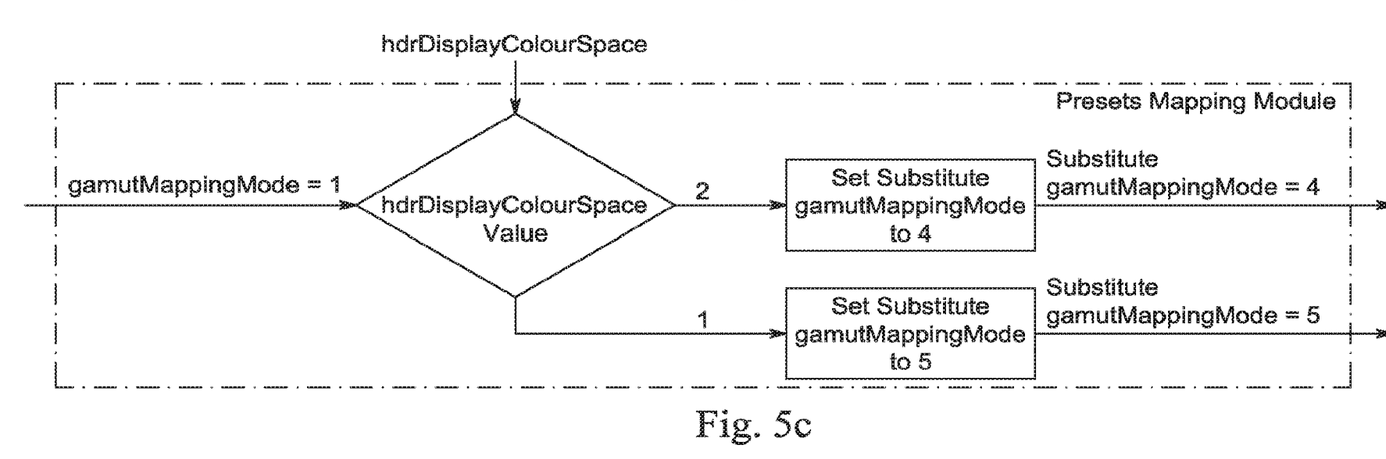
FIG. 5c illustrates a non-limitative example in accordance with SL-HDR2 bitstream of a block diagram of the step of determining a substitute gamut mapping mode.

FIG. 5b and FIG. 5c respectively illustrate a non-limitative example in accordance with SL-HDR1 bitstream and SL-HDR2 bitstream of the mapping module.

In the case of SL-HDR1, the first image is an image with standard color gamut (such as BT.709), the second image is an image with WCG (such as P3D65, BT.2020) and the mapping module selects the preset mode BT.709 to P3D65 gamut (gamutMappingMode is set to "2") when hdrDisplayColourSpace (or hdrMasterDisplayColourSpace) is equal to "2" and selects the preset mode BT.709 to BT.2020 gamut (gamutMappingMode is set to "3") when hdrDisplayColourSpace (or hdrMasterDisplayColourSpace) is equal to "1".

In the case of SL-HDR2, the first image is an image with WCG (such as to P3D65, BT.2020), the second image is an image with standard color gamut (such as BT.709) and the mapping module selects the preset mode P3D65 to BT.709 gamut (gamutMappingMode is set to "4") when hdrDisplayColourSpace (or hdrMasterDisplayColourSpace) is equal to "2" and selects the preset mode BT.2020 to BT.709 gamut (gamutMappingMode is set to "5") when hdrDisplayColourSpace (or hdrMasterDisplayColourSpace) is equal to "1".

It is noted that this mapping module can apply to every receiver/device implementing either SL-HDR1, 2 or 3 specifications.

According to yet other embodiments, instead of using hdrDisplayColourSpace, one can use src_mdcv_primaries_*syntax elements specified in Annex A.2.2.2 of SL-HDR1 specification, or display_primaries_*syntax elements specified in HEVC specification, or service signaling information from ATSC3.0 or CN-HDR at the transport layer. Typically, mapping to presets can be inspired from Table A.5 for display_primaries_*syntax elements or Table A.4 for src_mdcv_primaries_*elements, the lost or corrupted parameters are recovered from at least one set of pre-determined parameter values previously stored.

On FIG. 1-5c, the modules are functional units, which may or not be in relation with distinguishable physical units.

For example, these modules or some of them may be brought together in a unique component or circuit, or contribute to functionalities of a software. A contrario, some modules may potentially be composed of separate physical entities. The apparatus which are compatible with the present principles are implemented using either pure hardware, for example using dedicated hardware such ASIC or FPGA or VLSI, respectively «Application Specific Integrated Circuit», «Field-Programmable Gate Array», «Very Large Scale Integration», or from several integrated electronic components embedded in a device or from a blend of hardware and software components.

Figure 6:
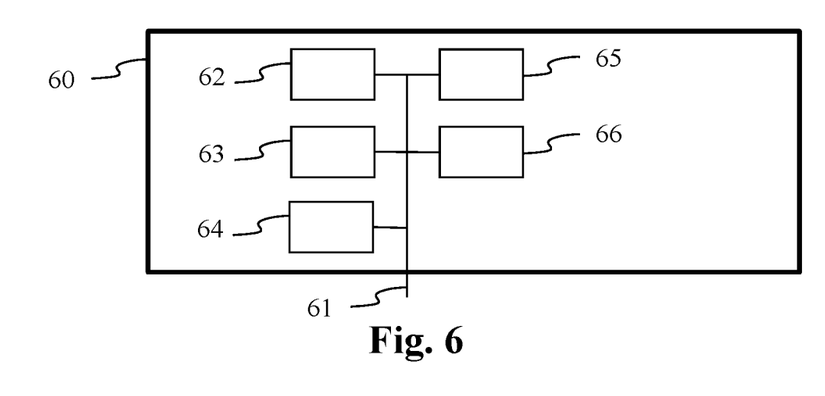
FIG. 6 shows an example of an architecture of a device in accordance with an example of present principles.

FIG. 6 represents an exemplary architecture of a device 60 which may be configured to implement a method described in relation with FIG. 1-5c.

Device 60 comprises following elements that are linked together by a data and address bus 61:
- a microprocessor 62 (or CPU), which is, for example, a DSP (or Digital Signal Processor);
- a ROM (or Read Only Memory) 63;
- a RAM (or Random Access Memory) 64;
- an I/O interface 65 for reception of data to transmit, from an application; and
- a battery 66

In accordance with an example, the battery 66 is external to the device. In each of mentioned memory, the word «register» used in the specification can correspond to area of small capacity (some bits) or to very large area (e.g. a whole program or large amount of received or decoded data). The ROM 63 comprises at least a program and parameters. The ROM 63 may store algorithms and instructions to perform techniques in accordance with present principles. When switched on, the CPU 62 uploads the program in the RAM and executes the corresponding instructions.

RAM 64 comprises, in a register, the program executed by the CPU 62 and uploaded after switch on of the device 60, input data in a register, intermediate data in different states of the method in a register, and other variables used for the execution of the method in a register.

The implementations described herein may be implemented in, for example, a method or a process, an apparatus, a software program, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

In accordance with an example of pre-processing and/or encoding device, the video or an image of a video is obtained from a source. For example, the source belongs to a set comprising:
- a local memory (63 or 64), e.g. a video memory or a RAM (or Random Access Memory), a flash memory, a ROM (or Read Only Memory), a hard disk;
- a storage interface (65), e.g. an interface with a mass storage, a RAM, a flash memory, a ROM, an optical disc or a magnetic support;

a communication interface (65), e.g. a wireline interface (for example a bus interface, a wide area network interface, a local area network interface) or a wireless interface (such as a IEEE 802.11 interface or a Bluetooth® interface); and an image capturing circuit (e.g. a sensor such as, for example, a CCD (or Charge-Coupled Device) or CMOS (or Complementary Metal-Oxide-Semiconductor)).

In accordance with an example of the post-processing and/or decoding device, the decoded video or reconstructed video is sent to a destination; specifically, the destination belongs to a set comprising:

a local memory (63 or 64), e.g. a video memory or a RAM, a flash memory, a hard disk;

a storage interface (65), e.g. an interface with a mass storage, a RAM, a flash memory, a ROM, an optical disc or a magnetic support;

a communication interface (65), e.g. a wireline interface (for example a bus interface (e.g. USB (or Universal Serial Bus)), a wide area network interface, a local area network interface, a HDMI (High Definition Multimedia Interface) interface) or a wireless interface (such as a IEEE 802.11 interface, WiFi® or a Bluetooth® interface); and a display.

In accordance with examples of pre-processing and/or encoding, the bitstream and/or the other bitstream carrying the metadata are sent to a destination. As an example, one of these bitstream or both are stored in a local or remote memory, e.g. a video memory (64) or a RAM (64), a hard disk (63). In a variant, one or both of these bitstreams are sent to a storage interface (65), e.g. an interface with a mass storage, a flash memory, ROM, an optical disc or a magnetic support and/or transmitted over a communication interface (65), e.g. an interface to a point to point link, a communication bus, a point to multipoint link or a broadcast network.

In accordance with examples of post-processing and/or decoding, the bitstream and/or the other bitstream carrying the metadata is obtained from a source. Exemplarily, the bitstream is read from a local memory, e.g. a video memory (64), a RAM (64), a ROM (63), a flash memory (63) or a hard disk (63). In a variant, the bitstream is received from a storage interface (65), e.g. an interface with a mass storage, a RAM, a ROM, a flash memory, an optical disc or a magnetic support and/or received from a communication interface (65), e.g. an interface to a point to point link, a bus, a point to multipoint link or a broadcast network.

In accordance with examples, device 60 being configured to implement a pre-processing method and/or encoding method as described above, belongs to a set comprising:

a mobile device;
a communication device;
a game device;
a tablet (or tablet computer);
a laptop;
a still image camera;
a video camera;
an encoding chip;
a still image server; and
a video server (e.g. a broadcast server, a video-on-demand server or a web server).

In accordance with examples, device 60 being configured to implement a post-processing method and or decoding method as described above, belongs to a set comprising:

a mobile device;
a communication device;
a game device;
a set top box;
a TV set;
a tablet (or tablet computer);
a laptop;
a display and
a decoding chip.

Figure 7:
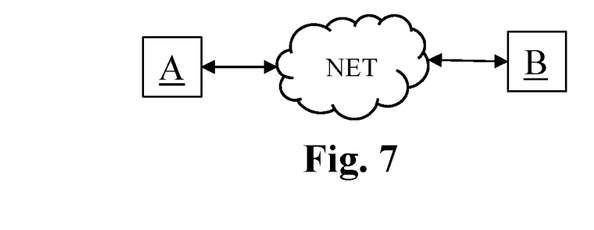
FIG. 7 shows two remote devices communicating over a communication network in accordance with an example of present principles.

According to an example of the present principles, illustrated in FIG. 7, in a transmission context between two remote devices A and B over a communication network NET, the device A comprises a processor in relation with memory RAM and ROM which are configured to implement a method for encoding an image as described above and the device B comprises a processor in relation with memory RAM and ROM which are configured to implement a method for decoding as described above.

In accordance with an example, the network is a broadcast network, adapted to broadcast still images or video images from device A to decoding devices including the device B.

A signal, intended to be transmitted by the device A, carries the bitstream and/or the other bitstream carrying the metadata. The bitstream comprises an encoded video as explained before. This signal further comprises metadata relative to parameter values used for reconstructing a video from said decoded video.

The signal further comprises an indicator identifying a set of pre-determined parameters used for recovering lost or corrupted parameters.

According to an embodiment, said indicator is hidden in metadata carried by the signal.

Implementations of the various processes and features described herein may be embodied in a variety of different equipment or applications. Examples of such equipment include an encoder, a decoder, a post-processor processing output from a decoder, a pre-processor providing input to an encoder, a video coder, a video decoder, a video codec, a web server, a set-top box, a laptop, a personal computer, a cell phone, a PDA, and any other device for processing a image or a video or other communication devices. As should be clear, the equipment may be mobile and even installed in a mobile vehicle.

Additionally, the methods may be implemented by instructions being performed by a processor, and such instructions (and/or data values produced by an implementation) may be stored on a computer readable storage medium. A computer readable storage medium can take the form of a computer readable program product embodied in one or more computer readable medium(s) and having computer readable program code embodied thereon that is executable by a computer. A computer readable storage medium as used herein is considered a non-transitory storage medium given the inherent capability to store the information therein as well as the inherent capability to provide retrieval of the information therefrom. A computer readable storage medium can be, for example, but is not limited to, an electronic, magnetic, optical, electromagnetic, infrared, or semiconductor system, apparatus, or device, or any suitable combination of the foregoing. It is to be appreciated that the following, while providing more specific examples of computer readable storage mediums to which the present principles can be applied, is merely an illustrative and not exhaustive listing as is readily appreciated by one of ordinary skill in the art: a portable computer diskette; a hard disk; a read-only memory (ROM); an erasable programmable read-only memory (EPROM or Flash memory); a portable compact disc read-only memory (CD-ROM); an optical storage device; a magnetic storage device; or any suitable combination of the foregoing.

The instructions may form an application program tangibly embodied on a processor-readable medium.

Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described example of the present principles, or to carry as data the actual syntax-values written by a described example of the present principles. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method for generating a second image from a first image, the method comprising:
    applying a color gamut mapping process on the first image to generate the second image, a content of the second image corresponding to a content of the first image but wherein a color space of the second image is different from a color space of the first image, the color gamut mapping process being controlled at least by a color gamut mapping mode obtained from a bitstream and, the color gamut mapping mode belonging to a set comprising at least two preset modes and an explicit parameters mode;
    the method further comprising, in case the obtained color gamut mapping mode is the explicit parameters mode and in case the color gamut mapping process of the method is not enabled for the explicit parameters mode for generating the second image from the first image, determining a substitute color gamut mapping mode from additional data, the color gamut mapping process being controlled by the substitute color gamut mapping mode.

2. The method of claim 1, wherein determining color gamut mapping mode further comprises selecting a color gamut mapping mode among the at least two preset modes.

3. The method of claim 1, wherein the additional data comprises at least one of the color space of the first image, the color space of the second image, a color space of the mastering display used to generate the first image, a color space of the mastering display used to generate the second image, a color space of the target display, or a color space of an input picture of SL-HDR pre-processing.

4. The method of claim 3, wherein the additional data is metadata signaled in the bitstream.

5. The method of claim 4, wherein the bitstream is SL-HDR1 bitstream.

6. The method of claim 5, wherein determining the substitute color gamut mapping mode comprises selecting preset mode BT.709 to P3D65 gamut by setting substitute gamutMappingMode to "2" when hdrDisplayColourSpace is equal to "2", and selecting preset mode BT.709 to BT.2020 gamut by setting substitute gamutMappingMode to "3" when hdrDisplayColourSpace is equal to "1".

7. The method of claim 4, wherein the bitstream is SL-HDR2 bitstream.

8. The method of claim 7, wherein determining the substitute color gamut mapping mode comprises selecting preset mode P3D65 to BT.709 gamut by setting substitute gamutMappingMode to "4" when hdrDisplayColourSpace is equal to "2", and selecting preset mode BT.2020 to BT.709 gamut by setting substitute gamutMappingMode to "5" when hdrDisplayColourSpace is equal to "1".

9. The method of claim 1, further comprising determining whether the color gamut mapping process is not capable of using the explicit parameters mode according to an indicator.

10. A non-transitory processor readable medium having stored therein instructions for causing a processor to perform at least the steps of the method according to claim 1 when executed on a computer.

11. A device for generating a second image from a first image, the device comprising:
    one or more processors, and at least one memory, wherein the one or more processors is configured to:
        color gamut map the first image to generate the second image, a content of the second image corresponding to a content of the first image but wherein a color space of the second image is different from a color space of the first image, the color gamut mapping being controlled by a color gamut mapping mode obtained from a bitstream, and the color gamut mapping mode belonging to a set comprising at least two preset modes and an explicit parameters mode; and
    wherein the one or more processors is configured to determine a substitute color gamut mapping mode from additional data in case the obtained color gamut mapping mode is the explicit parameters mode and in case the processor is not enabled for gamut mapping with the explicit parameters mode, the color gamut mapping being controlled by the substitute color gamut mapping mode.

12. The device of claim 11, wherein the one or more processors are configured to determine whether the gamut mapping is not enabled for the explicit parameters mode according to an indicator stored in the device.

13. The device of claim 11, wherein the device is a mobile device; a communication device; a game device; a set top box; a TV set; a Blu-Ray disc player; a player; a tablet; a laptop; a display; a camera; or a decoding chip.

* * * * *